US006594255B1

United States Patent
Neuman (10) Patent No.: US 6,594,255 B1
(45) Date of Patent: Jul. 15, 2003

(54) PBX WITH SHORT MESSAGING SERVICE ON A TELEPHONE DISPLAY

(75) Inventor: Aharon Neuman, Ramat Gan (IL)

(73) Assignee: Tadiran Telecom Business Systems Ltd., Petach-Tikva (IL)

( * ) Notice: Subject to any disclaimer, the term of this patent is extended or adjusted under 35 U.S.C. 154(b) by 0 days.

(21) Appl. No.: 09/247,170

(22) Filed: Feb. 9, 1999

(51) Int. Cl.[7] .............................................. H04Q 11/04
(52) U.S. Cl. .................. 370/352; 370/271; 370/395.52; 370/485; 370/493; 379/88.11; 379/88.12; 379/88.13; 379/93.01
(58) Field of Search ................................. 370/259, 260, 370/271, 352, 395.1, 395.5, 395.51, 395.52, 485, 487, 493, 494, 495; 379/88.11, 88.12, 88.13, 93.01

(56) References Cited

U.S. PATENT DOCUMENTS

| 4,866,758 | A | | 9/1989 | Heinzelman ................. 379/94 |
| 5,381,461 | A | * | 1/1995 | Baals et al. .................... 379/96 |
| 5,392,337 | A | | 2/1995 | Baals et al. .................... 379/96 |
| 5,768,509 | A | | 6/1998 | Günlük .................. 395/200.33 |
| 5,991,292 | A | * | 11/1999 | Focsaneanu et al. ........ 370/352 |
| 5,995,595 | A | * | 11/1999 | Hickey et al. ........... 379/88.12 |

FOREIGN PATENT DOCUMENTS

| EP | 0777394 | 6/1997 | ............ H04Q/7/22 |
| WO | 9710684 | 3/1997 | ............ H04Q/7/20 |
| WO | 9834422 | 8/1998 | ............ H04Q/7/00 |
| WO | 9847270 | 10/1998 | ........... H04L/29/02 |

OTHER PUBLICATIONS

Steve Smale, Hewlett Packard Ltd., The Mobile Phone As An E mail 'Client–of–Choice', 1995.
Allan March, Microwave Journal, "Cellular Data Services Over GSM" (Jul. 1995).

* cited by examiner

Primary Examiner—Dang Ton
Assistant Examiner—Shick Hom
(74) Attorney, Agent, or Firm—Nath&Associates PLLC; Harold L. Novick; Marvin C. Berkowitz (57) ABSTRACT

Method and apparatus for sending and displaying short messages from data network users which are linked to a telephonic network. The telephonic network comprises telephones, each with a display for visually displaying short messages to subscribers of the telephonic network. The apparatus holds a dialogue between the data network users and a software agent embedded in the telephonic network. The dialogue provides the telephonic network the content, the sender ID and the address information of each short message, stores the content and address information in a database, and displays the content of the messages on the telephone display of each destined subscriber.

8 Claims, 5 Drawing Sheets

PBX WITH SHORT MESSAGING SERVICE ON A TELEPHONE DISPLAY

FIELD OF THE INVENTION

The present invention relates to the field of communications. More particularly, the invention relates to an apparatus for sending short messages over a telephonic network from Internet Protocol (IP) users linked to the telephonic network, to subscribers of the network, and directly displaying the message on the display of their telephone terminals.

BACKGROUND OF THE INVENTION

The use of Short Message Services (SMS) is widespread and rapidly penetrating the market of cellular telephones. Short messages are also delivered from a base station to a plurality of subscribers by pagers, using radio communication channels. Additional applications, such as news, weather and traffic information also employ short messages that are delivered to rapidly update subscribers.

Another type of subscribers are subscribers that are connected to an information system via a telephonic connection. For example, subscribers such as employees in an organization normally are connected to a Private Branch Exchange (PBX) via personal telephone terminals. These telephone terminals, sometimes known as "smart telephones", comprise a small display, usually for displaying the time, date, name/identification of another PBX caller (subscriber) from the same organization and call duration measurement. These smart phones usually have a voice message recording capability in their inherent circuitry or in a corresponding memory cell located in the PBX. However, these voice messages are not promptly accessible and therefore, not effective when on line update is required. In addition, in order to access a PBX subscriber, it is necessary to dial up through the Public Switched Telephone Network (PSTN) and have access to the extension of the subscriber via the PBX.

Local Area Networks (LANs) enable several computers (users) to be connected to a computer network which is normally limited to the immediate area and operates according to one of the common networking protocols, such as Ethernet. PBXs sometimes comprise a built in path for connection to a LAN, that may also be connected to an IP network such as the Internet or Intranet via a router. Therefore, a physical connection is established between IP users that are distributed over the IP network and subscribers of the PBX. Messages may also be sent to a subscriber via E-mail, but this implies that the subscriber is connected to the LAN via a computer and that the E-mail application is continuously active. It is therefore desirable to provide a communication path between IP users and each extension of the PBX, that enables each subscriber equipped with a smart telephone to receive short messages from an IP user directly and promptly on his telephone display.

Several Voice Over IP (VOIP) techniques are employed to communicate IP users with subscribers of a PBX. Some of them employ gateway architectures (manufactured by, among others, Vocaltec and Netspeak) for this connection, which enable IP users to establish a voice call over the IP network. Although these architectures provide a communication path between the IP network and the PBX, they are limited to VOIP and can not be used to access the subscriber telephone display.

While E-mail is well known in the industry, it requires the recipient to have a computer, and to be connected to the E-mail delivery network, or to connect to the network in order to receive his E-mail. In adition, E-mail is not a real-time delivery network, typically involving a server computer in between the sender and the recipient.

U.S. Pat. No. 5,381,461 describes a telephone terminal with interactive display arrangement, which sufficiently provides a desired level of clarity to a user who wishes to move about in a hierarchy of menu screens available on the display. However, this arrangement is associated only with the visual interaction between the user and messages that represent operating features of the telephone terminal. No message delivery features from one telephone terminal to another are available, and the messaging functionality is limited to each specific terminal.

U.S. Pat. No. 5,392,337 describes an arrangement for varying the display time for messages displayable on a telephone terminal, according to the length and the complexity content of the information in each message. Here again, the messaging functionality is limited to each specific terminal.

U.S. Pat. No. 5,768,509 describes a Short Message Server (SMS) with relatively limited memory requirements, for storing messages destined to subscribers via a mobile telephone system. The SMS does not keep a subscriber database, but rather utilizes information stored in a Home Location Register (HLR) database to determine whether a message destination is valid and/or authorized. However, this SMS is designed to serve mainly TCP/IP based network, not subscribers of a Private Branch Exchange (PBX).

All the methods described above have not yet provided satisfactory solutions to the problem of sending a short message from IP users to a telephonic subscriber which may be directly displayed on his telephone display.

It is an object of the present invention to provide a method and apparatus for displaying a short message sent from an IP user to a telephonic subscriber, which overcome the drawbacks of prior art.

It is another object of the present invention to provide a method and apparatus for displaying a short message sent from an IP user to a telephonic subscriber directly on his telephone display.

It is still another object of the present invention to provide a method and apparatus for displaying a short message sent from an IP user to the telephone display of a telephonic subscriber using unsophisticated software.

Other objects and advantages of the invention will become apparent as the description proceeds.

SUMMARY OF THE INVENTION

The present invention is directed to a method for sending and displaying short messages from IP users which are linked to a telephonic network via a LAN and an IP network, such as the Internet, to subscribers of the telephonic network. By using the term "IP network" it is meant to include any network or any system, in which data packets are arranged and transferred according to the Internet Protocol (e.g., the Internet, an Intranet, a LAN, a WAN and others) or any other "packet switched network" including any network or any system, in which data is divided to packets of fixed or variable size and then transferred to its destination.

A dialogue is held between said IP users and a call manager embedded in the telephonic network. The dialogue provides the call manager the content, sender ID and address information of each short message. The sender ID may include any type of information that can identify the sender, such as a code, his real name, a nickname, his E-mail adress etc. The content and sender ID information are stored in a database, providing each subscriber an indication about received short messages, and the messages are displayed on his telephone display in response to a signal from the subscriber.

Preferably, a plurality of IP users are distributed over the IP network with direct access to the IP network. Preferably, a LAN is used to connect a second plurality of local users, and a router is used to connect between the LAN and the IP network. A PBX is linked to the LAN, and is connected to a plurality of extensions. The PBX is capable of storing and converting incoming IP data from the IP network to a telephonic protocol and transferring the converted data to each extension. A plurality of smart telephones are connected to corresponding extensions of the PBX. Each telephone comprises a display for visually displaying arriving messages and an indicating circuitry for providing indications about arriving messages. The PBX also comprises a processing storage and control circuitry for processing and storing arriving messages and sending them to their destined PBX extension according to address information, and a software agent for chatting with the IP user by sending to and receiving from the user, data packets in chat mode. By using the term "chatting", it is meant to describe a visual/textual, real-time, bidirectional transmission between two entities connected via an IP network in a bidirectional session. While chatting, messages are delivered immediately, without the need to store them first in a server. A connection is established between the IP user and the software agent by operating an SMS to PBX or chat software by the IP user and providing the IP address of the PBX. Each IP user (sender) who wishes to send a short message operates chat software to communicate with the software agent. Each short message contains address and a text fields, delimited by prefixed characters. The software agent, embedded into the LAN interface card, collects the content and address information of short messages obtained during each chat session, and sends them to the call manager software which resides on the main call processor board, which processes the collected information and stores the information separately for each destined extension. The LAN interface card sends a confirmation message to said IP user. An indication is sent to the subscriber's telephone which is connected to the destined extension and operates a beep and/or a blinking lamp in the telephone. Upon receiving a request signal from the destined subscriber, all stored short messages which are destined to said extension are retreived from said storage and control circuitry and sent to the display of said subscriber's telephone over the telephonic connection between the PBX and the destined extension.

The invention is also directed to an apparatus for sending and displaying short messages from IP users which are linked to a telephonic network via a LAN and/or an IP network, such as the Internet, to subscribers of the telephonic network. The apparatus comprises circuitry for holding a dialogue between said IP users and a call manager embedded in said telephonic network, circuitry for providing said call manager the content, sender ID and address information of each short message, circuitry for storing said content and address information in a database, circuitry for providing each subscriber an indication about sent short messages and circuitry for displaying the content of said messages on his telephone display in response to a signal from said subscriber.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
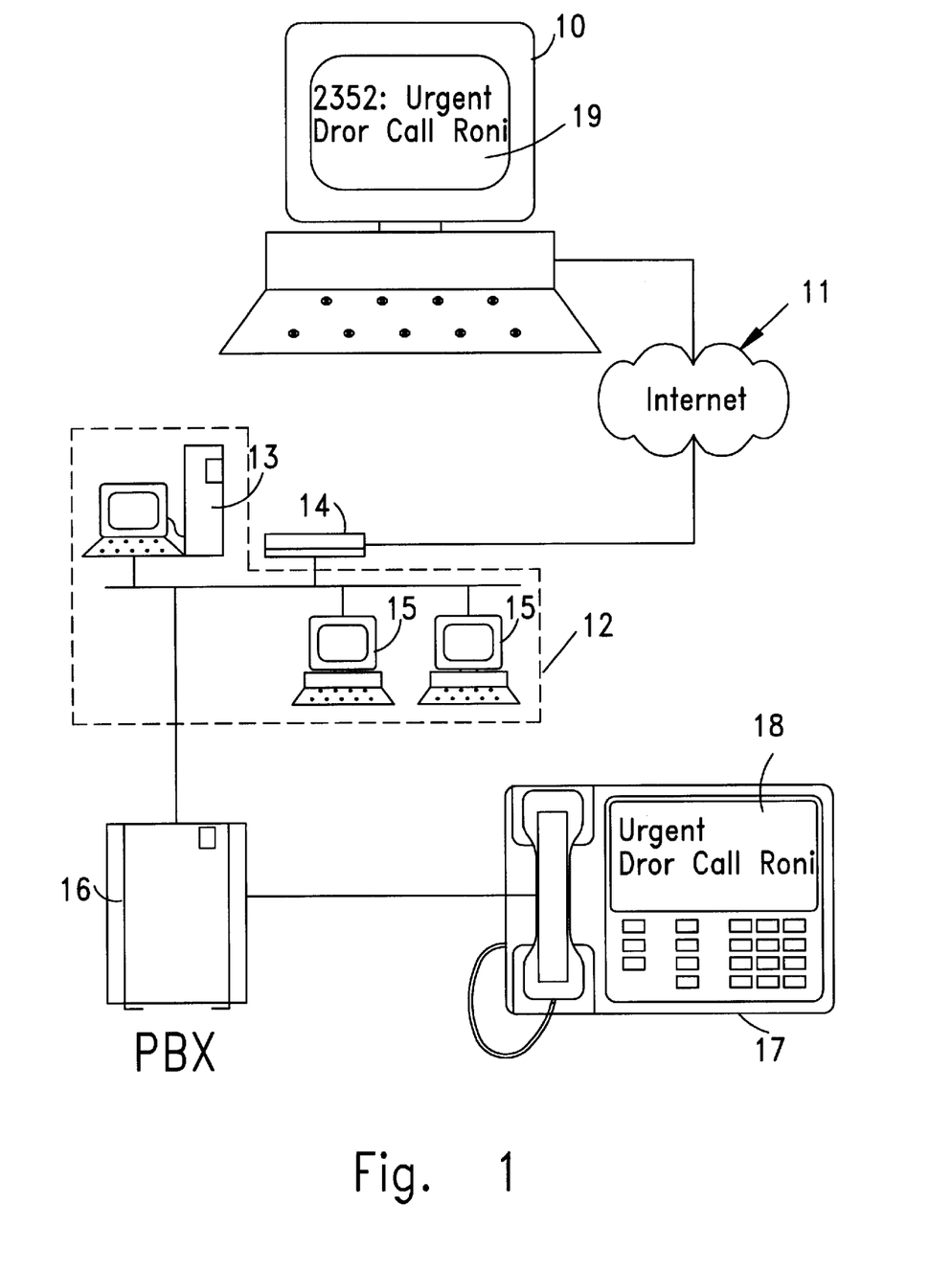
FIG. 1 illustrates the communication path between an IP user and the telephone display of a destined subscriber, according to a preferred embodiment of the invention.

FIG. 1 illustrates the construction of a communication path between an IP user and the telephone display of a subscriber that is connected to an extension of a PBX, according to a preferred embodiment of the invention. A plurality of IP users 10 are connected to an IP network 11 which may be, for instance, the Internet. A LAN 12, which comprises a plurality of users 15 and a server 13, is connected to the IP network 11 via a router 14, which is normally a special purpose computer that handles the connection between the LAN 12 and the IP network. Router 14 routes data packets to destinations, according to their addresses. A PBX 16, which is linked to the LAN 12, comprises a plurality of extensions each of which is terminated with a smart telephone 17 with a visual display 18. Optionally, additional extentions may be terminated with standard telephones which may be compatible with Plain Old Telephone Services (POTS), with no messaging capability.

In this example, an IP user 10 named 'Roni' wishes to send an urgent short message to a subscriber named "Dror" whose telephone extension is # 2352 of the PBX 16. According to a preferred embodiment of the invention, the IP user 10 operates a software in his computer which is able to access the PBX 16 via a unique address in the IP network. This software connects the IP user to the PBX 16 via the IP network 11, router 14 and LAN 12. A software agent in the PBX 16 introduces text questions, or optionally vocal questions to the IP user about the subscriber (to whom the short message is destined) details, such as extension number or name, and provides the IP user text, or optional voice instructions indicating how to type the short message in his computer. The short message is sent as packets over the communication path, and saved in a Main Call Processor (MCP) at the PBX. The MCP sends the short message to the telephone display over a standard link within the PBX 16. In this configuration, users 15 connected to the LAN 12 can also send a short message to the telephone display of any extension.

The transfer of data packets (e.g., VOIP and/or text messages) may be carried out in Transmission Control Protocol/Internet Protocol (TCP/IP) (commonly used in the Internet) which is associated with the Network and Transport layers. A higher layer protocol, which may be standard or proprietary, is required for the SMS path. This higher layer protocol is implemented by a software program that is operated by each IP user (sender) 10 and embedded in the PBX 16. According to a preferred embodiment of the invention, a chat program that enables real time data communication is employed with no need for a special server. The PBX comprises a software that can handle incoming chat calls by a software agent (a "dummy" chat partner) and manage a basic dialogue with the IP user 10, so as to instruct the IP user about required details to be sent with the message. In the message example of FIG. 1, the IP user is asked to type first the desired extension number (2352) followed by a ';' which indicates the end of the destination and then to type the message followed by '!' which indicated the end of the message. This program is advantageous since the sender is not required to operate a special program and no additional specialized software needs to be downloaded for each PBX, and senders can simply use their standard chat software, such as ICQ software (by Mirabilis), as long as the PBX software agent has been programmed with a compatible chat software.

The IP user may send a short instant message to the PBX or chat with the software agent at the PBX. According to a preferred embodiment of the invention, an IP user 10 may communicate with the PBX 16 using a long dialogue mode. In this mode, the IP user operates an SMS to PBX communication program which provides the address of the destined PBX and then begins chatting with a software agent (a dummy user) at the PBX.

The following dialogue represents an example of a long dialogue mode. In the example a remote user named 'Shiri' wishes to send the short message "I will call you tomorrow morning" to a PBX subscriber named 'Roni'. The PBX is linked to a site named 'Tadiran'.

Tadiran →"You have reached the Tadiran's Coral agent. Send short message to:"

Shiri →"Roni"

Tadiran →"Type your message (max 80 characters) followed by '!'"

Shiri →"I will call you tomorrow morning. !"

Tadiran →"Your message has been delivered successfully. Good-bye"

According to another preferred embodiment of the invention, an IP user 10 may communicate with the PBX 16 using a short dialogue mode. In this mode, the IP user may start the connection with the destined PBX by operating an SMS to PBX program that provides the IP address of the destined PBX and may send an instant message with full details of the destination adress, including the extention number in the PBX or the recepient's name, in a single transmission. The message is sent in a specified format, using a ";" as a delimiter between the ID information and the message, and then his message followed by a '!' or any other predetermined character. In this case, no chat session is initiated, and a response (which is also sent as an instant message) is sent only in the event of a problem, such as a wrong adress. Instant messaging is a mode of IP messaging, where the message is sent and delivered promptly, and not stored on an intermediary server.

The following dialogue represents an example of a short dialogue mode. In the example a remote user named 'Shiri' wishes to send the short message "I will call you tomorrow morning" to a PBX subscriber named 'Roni'. The PBX is linked to a site whose IP adress is 'Tadiran.pbx'.

Shiri →"Rony; I will call you tomorrow morning."!

After the short message is sent to the subscriber located at the destined extension, the message data drives one or more of the features of the smart telephone at the destined extension. For example, the smart telephone may announce a short beep and/or the message LED may start blinking or a message button may be illuminated. The subscriber may read a sent short message by pressing predefined keypad buttons or the short message button. Up/down arrows may be used by a subscriber for browsing his messages. After deleting all messages, the illumination of the button is terminated. A prefixed combination of keypad buttons such as "#0" may be pressed to delete a message.

Figure 2:
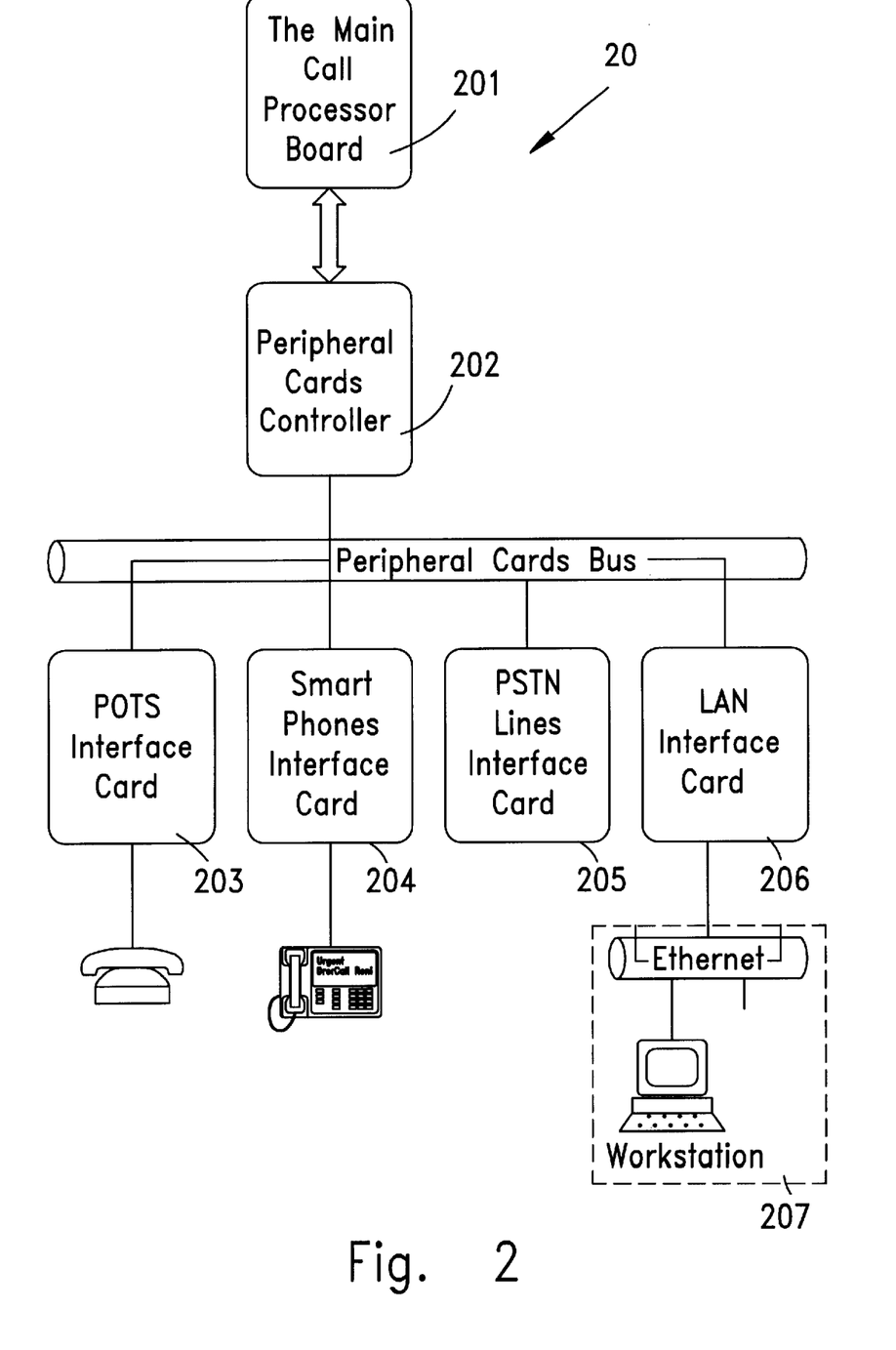
FIG. 2 is a block diagram of the PBX circuitry, employing a software agent and a call manager, according to a preferred embodiment of the invention.

FIG. 2 is a block diagram of the PBX circuitry portion, that controls the display telephones by the call manager, according to a preferred embodiment of the invention. The circuitry portion 20 comprises a Main Call Processor Board 201, which is used to run a main call manager application that interacts with peripheral devices through a peripheral card controller 202 which controls message delivery through one of the peripheral cards. Peripheral devices may comprise Plain Old Telephone Services (POTS), smart telephones, Public Switched Telephone Network (PSTN) lines and LANs. Each peripheral card functions as a specific driver for one of the peripheral devices. The group peripheral cards may comprise a POTS interface card 203, a smart phone interface card 204, a PSTN interface card 205 and a LAN interface card 206 which is used in this example to connect the circuitry portion 20 to an Ethernet LAN 207. The LAN interface card 206 contains the software agent which provides the dialogue with IP users. The main call manager application is a software program that saves incoming messages to the PBX's subscribers and is run by the Main Call Processor Board 201, which is also used to run the short message feature that controls message delivery from the PBX to the destined extension. It is to be noted that the main call manager applicated herein, discussed in only part of total main call manager application which actually controls the functioning of the PBX.

Figure 3:
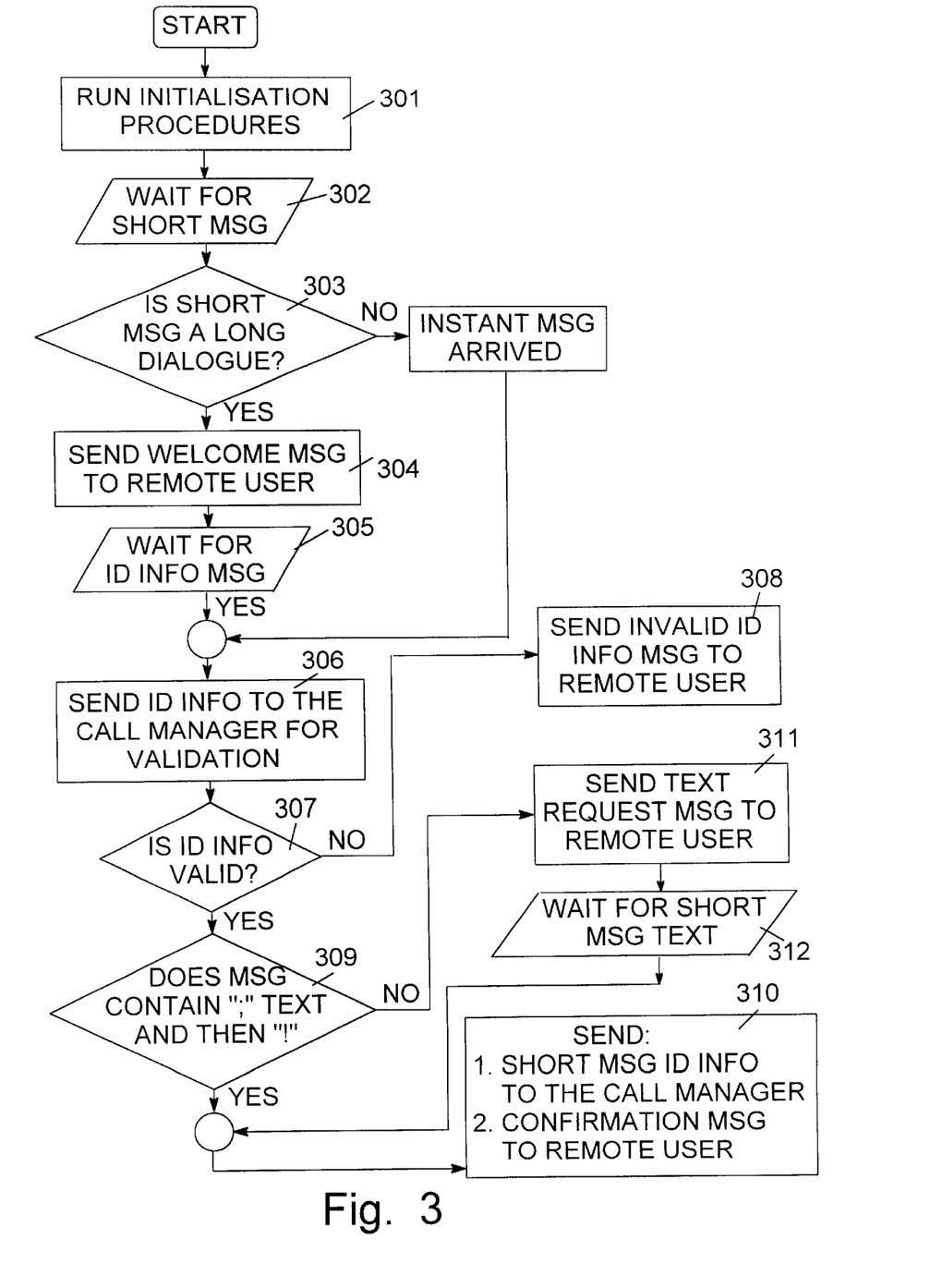
FIG. 3 is a flowchart of the LAN interface card operation, according to a preferred embodiment of the invention.

FIG. 3 is a flowchart of the LAN interface card operation, according to a preferred embodiment of the invention. At the first step 301 the LAN interface card carries out initialization procedures. At the next step 302 the LAN interface card waits for a short message initialization from an IP user. At the next step 303 the LAN interface card checks if the initialized message is a short form SMS to PBX message or a long dialog form. If the message is a long dialog form, a greeting message is sent to the IP user at the next step 304. At the next step 305 the LAN interface card waits for ID information about the desired message destination. At the next step 306 the ID information is sent to the main processor board 201 for validation using the call manager application software. On the other hand, if the message is a short dialogue, steps 304 and 305 above are skipped and the ID information is directly sent to the main processor board 201 for validation according to step 306. At the next step 307 the call manager application software checks if the ID information is valid. If the ID information is not valid, at step 308 a message indicating that the ID information is invalid is sent to the IP user. If the ID information is valid, at the next step 309 the software agent checks if the message comprises prefixed delimit and termination characters that define the message limits. If the message limits complies with the prefixed delimit and termination characters, at the next step 310 the ID information together with the content of short message are sent to the Main Call Processor where the call manager software resides. In the same time a confirmation message is sent to the IP user (sender). If the message limits do not comply with the prefixed delimit and termination characters, a message containing a request for text is sent back to the IP user at step 311, and the LAN interface card waits for a (new)correct message text at step 312. As soon as a correct text message is sent, the ID information together with the content of short message are sent to the Main Call Processor and in the same time a confirmation message is sent to the IP user, according to step 310 above.

According to a preferred embodiment of the invention, short messages arriving to the Main Call Processor Board 201 are stored in two data structures. The first data structure, named "Short Message Text" (SMT) is a kind of a "memory pool", in which short messages that belong to the same extension (i.e., to the same smart telephone, also named DKT) are linked. Table 1, which comprises an Entry field, a Text field, a Sender ID field and a Next Entry field, is an example of the first data structure:

TABLE 1

| Entry # | Text    | Sender ID | Next Entry # |
|---------|---------|-----------|--------------|
| 0       | Text #0 |           | 2            |
| 1       | Text #1 |           | Null         |
| 2       | Text #2 |           | Null         |
| 3       |         |           |              |
| 4       |         |           |              |
| 5       |         |           |              |

Incoming messages are organized such that at the end of each entry, the next entry # field provides information about the next entry which is also destined to the same extension. If a current entry is the last one for the same extension, the next entry for this extension is a null. The first entry (#0) in Table 1 comprises a short message "Text #0", destined to extension #XXXX. The next entry for extension #XXXX is entry #2 which contains "Text #2", with no further entries (indicated by a null for its next entry). The second entry (#1) in Table 1 comprises a short message "Text #1", destined to extension #YYYY", with no further entries (indicated by a null for its next entry).

The second data structure, named "DKT driver" comprises one entry for each DKT. Table 2, which comprises an Entry number, an Extension field, a Name field and a Short Message field, is an example of the second data structure:

TABLE 2

| Entry # | Extension # | Name   | ... | ShortMsg | ... |
|---------|-------------|--------|-----|----------|-----|
| 0       | 2825        | Roni   |     | 0        |     |
| 1       | 2360        | Rachel |     | 1        |     |
| 2       | 2181        | Moses  |     | Null     |     |
| 3       | ...         | ...    |     | Null     |     |
| 4       | ...         | ...    |     | Null     |     |

Table 2 is organized such that each entry relates to corresponding (destined) extension, name and pointer to the first message in the SMT data structure pertinent to this extention. In the example of Table 2, the message (s) for extension 2825 are found starting at entry #0 in the SMT data structure, and the message for extension 2360 are found starting at entry #1. There are no messages waiting for extension 2181.

Figure 4:
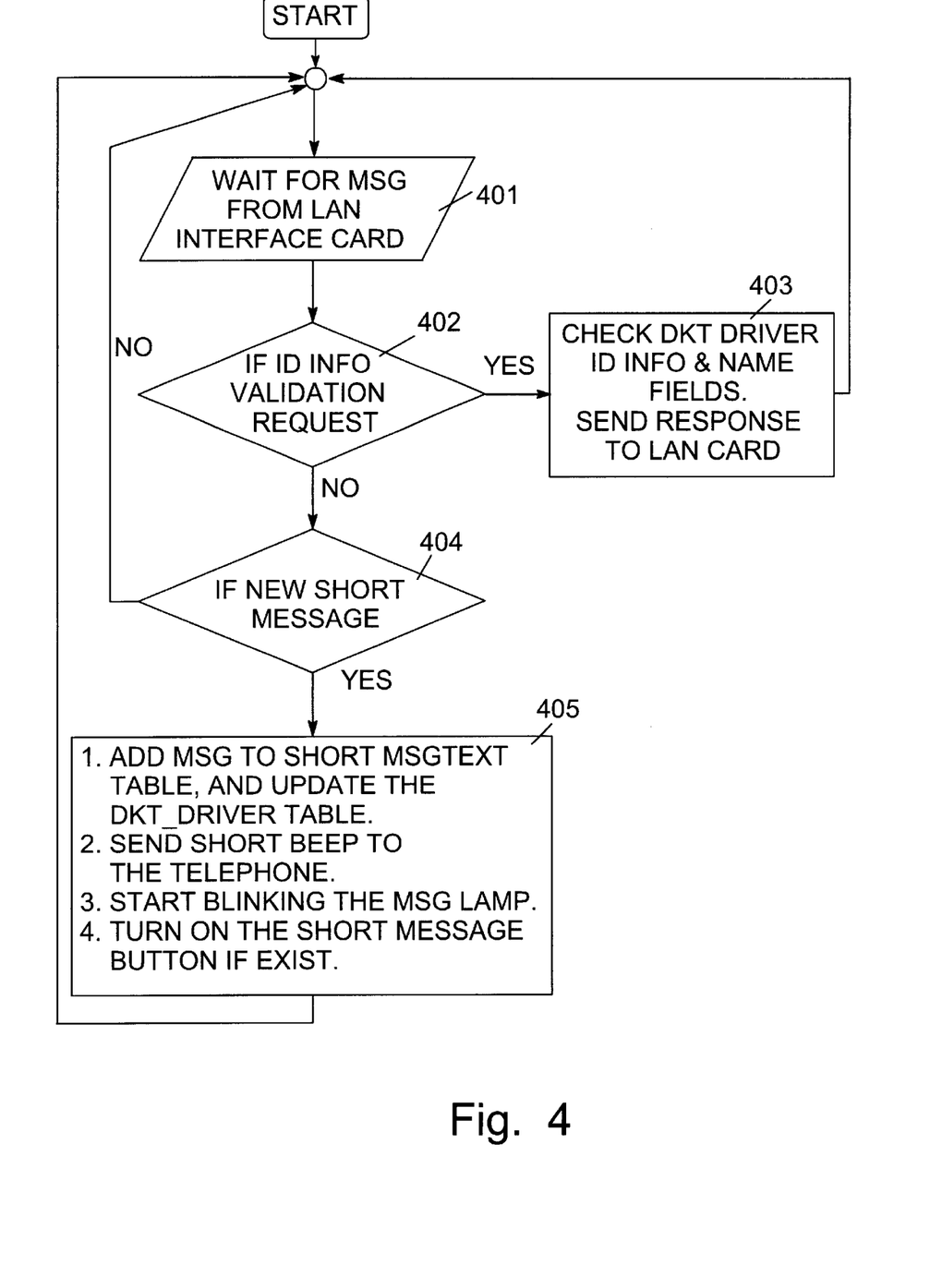
FIG. 4 is a flowchart of the main call manager application operations, used to interact with peripheral devices in response to requests from the LAN interface card.

FIG. 4 is a flowchart of the main call manager application operations (employed by the Main Call Processor Board 201), which, according to a preferred embodiment of the invention, is used to interact with peripheral devices in response to requests from the LAN interface card 206. At the first step 401, the main call manager waits for an incoming message from the LAN interface card 206. At the next step 402 the main call manager checks if there is a request for validation of ID information. If there is a request, the main call manager checks the ID information and Name fields and thereafter sends a response to the LAN interface card at step 403. If there is no such request, at the next step 404 the main call manager checks if there is a new short message. If there is, at the next step 405 the main call manager adds the new message to the SMT data structure (exemplified by Table 1) and updates the DKT driver data structure (exemplified by Table 2) if necessary (i.e, if there was no previous messages in the SMT data structure). In addition, an indication signal (such as a short beep and/or a blinking message lamp and/or an illuminating short message button) is lit in the smart telephone connected to the destined extension. Prior to lighting the lamp, the current status is first checked, as if it lit, no lighting message needs to be sent. However, an audible signal may be sent with each new message that is received. If there is no new message, the next operation is to return to step 401 and wait.

Figure 5:
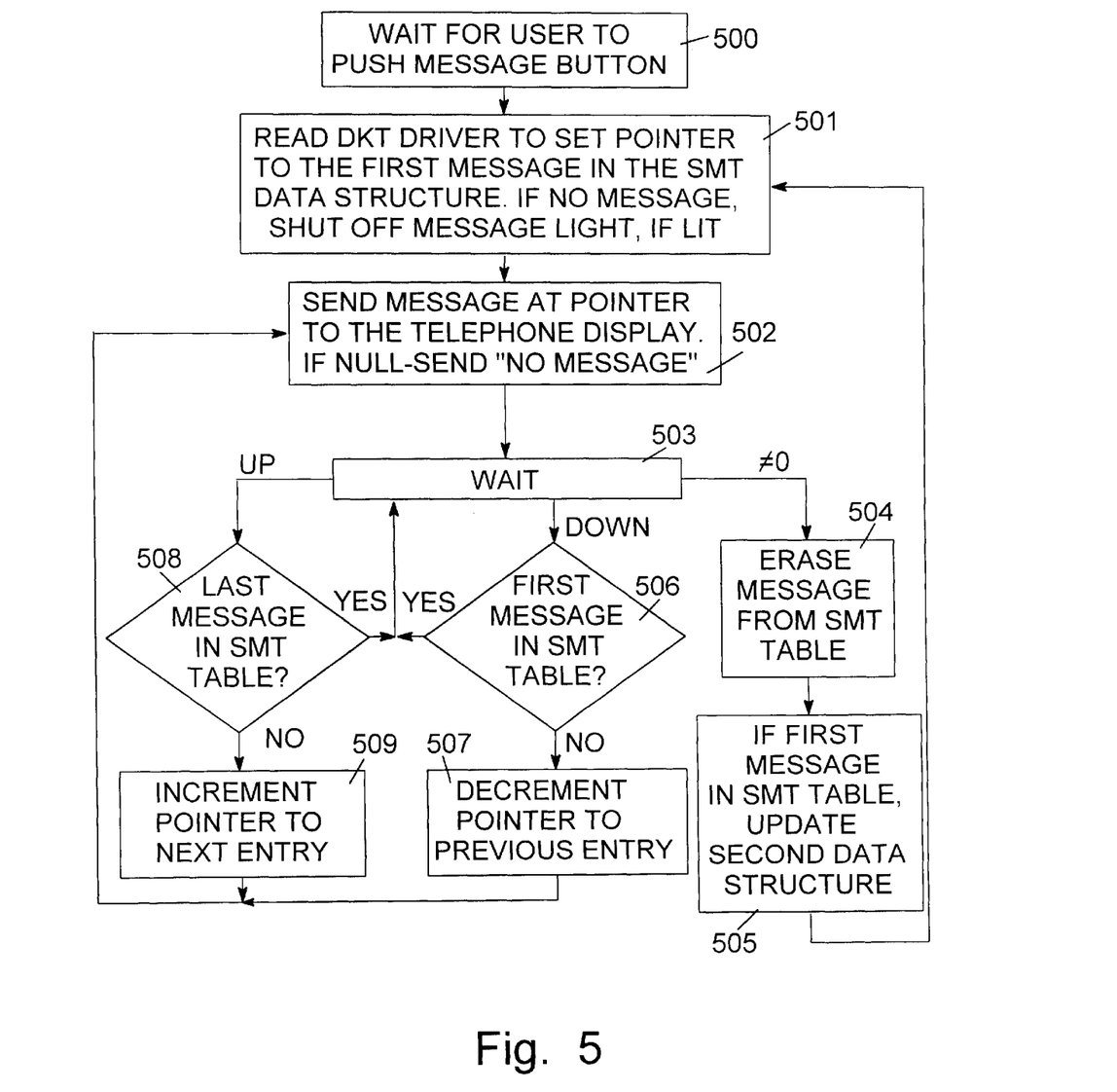
FIG. 5 is a flowchart of the program for reading a sent short message, according to a preferred embodiment of the invention.

FIG. 5 is a flowchart of the program for reading a sent short message, according to a preferred embodiment of the invention. The first step 500 is a waiting stage until the subscriber operates the message button to see his short messages. At the next step 501, the main call manager reads the second data structure (the DKT driver) and sets the pointer to the first message in the first (SMT) data structure. If the reading is a null, at step 502 a "no messages" text is displayed on the subscriber's telephone display. If the reading is not a null, at the next step 502 the message at the pointer is sent and displayed on the subscriber's telephone display. At the next step 503, the program waits for inputs from the subscriber. The subscriber may scroll through the messages by using one of the known methods, such as arrow keys found on most display phones. This is well known in the PBX industry.

If the subscriber pushes the #0 buttons, the read message is erased from the first (SMT) data structure at the next step 504, by replacing the contents of the next Entry # field that points to the erased message, with the content of the next Entry # field of the message being erased. If the deleted message is the first message in the first (SMT) data structure, at the next step 505 the second data structure (the DKT driver) is updated with the new location, and the program returns to step 501. If there are no messages left, the message lamp is turned off.

If the subscriber pushes the down-pointing arrow (in the displayed menu), at the next step 506 the program checks if the displayed message is the first message in the SMT data structure. If it is, the program continues to display the message (step 502), and returns to step 503 and waits for inputs. If not, at the next step 507, the pointer is decremented to the previous entry. The message at the pointer is displayed at step 502, and the program returns to step 503.

If the subscriber pushes the up-pointing arrow (in the displayed menu), at the next step 506 the program checks if the displayed message is the last message in the SMT data structure. If it is, the program continues to display the message at step 502, returns to step 503 and waits for inputs. If not, at the next step 509, the pointer is incremented to the next entry and the program displays the next entry at step 502, and returns to step 503.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

What is claimed is:

1. A method for sending and displaying short messages from at least one data network user to at least one subscriber of a telephonic network, said telephonic network having at least one telephone, said at least one telephone having a display for visually displaying said short messages, wherein said method comprises:

holding a dialogue between said at least one data network user and a software agent embedded in the telephonic network, said dialogue providing said telephonic network a content and an address information of each short message, storing said content and address information in a database, and displaying the content of said message on the telephone display of said at least one subscriber wherein the storage of said content and address information comprises:
   a) generating a first data structure, in which all messages destined to a same extension are linked;
   b) generating a second data structure, in which each message is separately stored according to its destined extension;
   c) storing each arriving short message in said second data structure;
   d) organizing said stored short messages with links between messages destined to the same extension; and
   e) storing said linked messages and any remaining unlinked messages in said first data structure.

2. The method according to claim 1, wherein the short message is sent as a single message, said short message containing content and address information of each short message.

3. The method according to claim 1, wherein at least one telephone from a plurality of telephones having said display for visually displaying said short messages and further having an indicating circuitry for providing indications about arrival of said short messages.

4. The method according to claim 1, wherein said telephonic network is a PBX.

5. The method according to claim 1, wherein the telephonic network is connected to a data network via a LAN, said LAN connecting a plurality of local users and being capable of exchanging addressable data between each data network user and each local user.

6. The method according to claim 1, wherein said at least one telephone of said telephonic network having said display for visually displaying said short messages, and further comprising an indicating circuitry for providing indications about arriving of said short messages, and means for retrieving said short messages from a database.

7. The method according to claim 1, wherein said at least one data network user is a user in a packet switched network.

8. The method according to claim 1, wherein said at least one data network user is a user in the Internet or of an Intranet.

* * * * *